United States Patent
Kimayong et al.

(10) Patent No.: US 12,289,325 B2
(45) Date of Patent: Apr. 29, 2025

(54) BLOCKING OR ALLOWING A FILE STREAM ASSOCIATED WITH A FILE BASED ON AN INITIAL PORTION OF THE FILE

(71) Applicant: Juniper Networks, Inc., Sunnyvale, CA (US)

(72) Inventors: Paul Randee Dilim Kimayong, Watertown (SG); Mounir Hahad, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 313 days.

(21) Appl. No.: 17/457,523

(22) Filed: Dec. 3, 2021

(65) Prior Publication Data
US 2023/0179607 A1    Jun. 8, 2023

(51) Int. Cl.
*H04L 9/40*    (2022.01)

(52) U.S. Cl.
CPC .............................. *H04L 63/1416* (2013.01)

(58) Field of Classification Search
CPC ..... H04L 63/1416; G06F 21/56; G06F 21/562
See application file for complete search history.

(56) References Cited

U.S. PATENT DOCUMENTS

| | | | |
|---|---|---|---|
| 7,519,990 B1* | 4/2009 | Xie | H04L 63/1425 726/13 |
| 2006/0161761 A1 | 7/2006 | Schwartz et al. | |
| 2008/0141373 A1 | 6/2008 | Fossen et al. | |
| 2009/0133125 A1* | 5/2009 | Choi | G06F 21/562 726/24 |
| 2009/0168651 A1* | 7/2009 | Xie | H04L 63/145 370/235 |
| 2017/0093892 A1* | 3/2017 | Prokudin | G06F 21/56 |
| 2021/0019412 A1 | 1/2021 | Hewlett, II et al. | |
| 2021/0021611 A1 | 1/2021 | Hewlett, II et al. | |
| 2021/0173930 A1* | 6/2021 | Dahal | H04L 63/145 |

OTHER PUBLICATIONS

Extended European Search Report for Application No. EP22206299, mailed on Apr. 25, 2023, 10 pages.
"WildFire Inline ML"; paloalto Techdocs; pp. 1-3; 2021 Palo Alto Networks, Inc.; https://docs.paloaltonetworks.com/pan-os/10-0/pan-os-admin/threat-prevention/wildfire-inline-ml.html.

\* cited by examiner

*Primary Examiner* — Bryan Y Lee
(74) *Attorney, Agent, or Firm* — Harrity & Harrity, LLP

(57) ABSTRACT

A network device may be configured to receive a file stream associated with an file. The network device may be configured to identify, based on receiving the file stream, an initial portion of the file. The network device may be configured to process the initial portion of the file to determine one or more features of the file. The network device may be configured to generate, based on the one or more features of the file, a determination as to whether the file is malicious. The network device may be configured to block or allow, based on the determination, the file stream.

20 Claims, 13 Drawing Sheets

BLOCKING OR ALLOWING A FILE STREAM ASSOCIATED WITH A FILE BASED ON AN INITIAL PORTION OF THE FILE

BACKGROUND

Identifying malicious behavior (e.g., a cyberattack, malware, and/or the like) is typically a time-consuming process for a network security team. Many products exist that attempt to lure or trap a bad actor (e.g., a network intruder) into revealing themselves, and that trigger a wide variety of actions from a network (e.g., blocking the network intruder, stopping malware and/or a cyberattack, and/or the like).

SUMMARY

Some implementations described herein relate to a network device. The network device may include one or more memories and one or more processors. The network device may be configured to receive a file stream associated with a file. The network device may be configured to identify, based on receiving the file stream, an initial portion of the file. The network device may be configured to process the initial portion of the file to determine one or more features of the file. The network device may be configured to generate, based on the one or more features of the file, a determination as to whether the file is malicious. The network device may be configured to block or allow, based on the determination, the file stream.

Some implementations described herein relate to a non-transitory computer-readable medium that stores a set of instructions for a network device. The set of instructions, when executed by one or more processors of the network device, may cause the network device to receive a file stream associated with a file. The set of instructions, when executed by one or more processors of the network device, may cause the network device to identify, based on receiving the file stream, an initial portion of the file. The set of instructions, when executed by one or more processors of the network device, may cause the network device to determine, based on the initial portion of the file, that the file is not a known benign file. The set of instructions, when executed by one or more processors of the network device, may cause the network device to process, after determining that the file is not a known benign file, the initial portion of the file to determine one or more features of the file. The set of instructions, when executed by one or more processors of the network device, may cause the network device to generate, based on the one or more features of the file, a determination as to whether the file is malicious. The set of instructions, when executed by one or more processors of the network device, may cause the network device to block or allow, based on the determination, the file stream.

Some implementations described herein relate to a method. The method may include processing, by a device, an initial portion of a file to determine one or more features of the file. The method may include generating, by the device and based on the one or more features of the file, a determination as to whether the file is malicious. The method may include causing, by the device and based on the determination, a file stream associated with the file to be blocked or allowed.

DETAILED DESCRIPTION

Figure 1A:
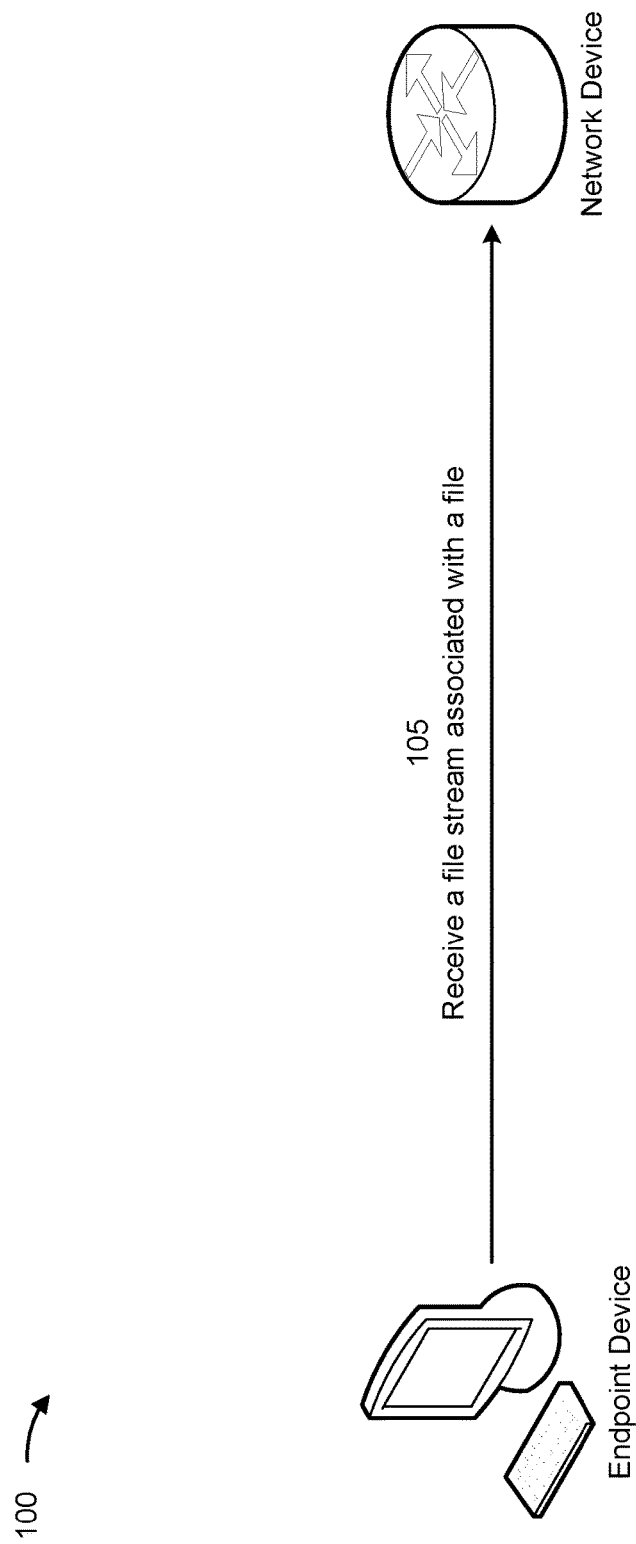
FIGS. 1A-IF are diagrams of an example implementation described herein.

The following detailed description of example implementations refers to the accompanying drawings. The same reference numbers in different drawings may identify the same or similar elements.

Malicious behavior, such as related to a malicious file, a cyberattack, malware, and/or the like, may be caused by a bad actor (e.g., a network intruder) based on compromising an endpoint device associated with a network. A malicious file may be blocked when the malicious file is identified (e.g., fingerprinted) and the fingerprint of the malicious file is identified. However, current techniques for blocking a malicious file may also create a fingerprint that matches other, benign files not associated with the malicious file (e.g., benign files are prone to false positive and/or negative indications of the malicious file). The current techniques also utilize a full-file hash to create the fingerprint for the malicious file. The entire malicious file needs to be utilized to create the full-file hash, which slows network traffic and consumes computing resources (e.g., processing resources, memory resources, communication resources, and/or the like), networking resources, and/or the like associated with processing the entire malicious file, generating false positive and/or negative indications of the malicious file, failing to identify the malicious file, attempting to address the false positive and/or negative indications of the malicious file, and/or the like.

Some implementations described herein provide a network device that receives (e.g., from an endpoint device) a file stream associated with a file, such as an executable file. The network device (e.g., while the network device is receiving the file stream) identifies an initial portion of the file and processes the initial portion to determine whether the file is a known benign file. When the network device determines that the file is a known benign file, the network device allows the file stream.

In some implementations (e.g., after determining that the file is not a known benign file), the network device processes the initial portion to determine one or more features of the file. Accordingly, the network device generates, based on the one or more features, a determination as to whether the file is malicious. In some implementations, the network device processes the one or more features using a machine learning model to generate the determination as to whether the file is malicious. Based on the determination, the network device blocks or allows the file stream. For example, the network device blocks the file stream when the determination indicates that the file is malicious. As an alternative example, the network device allows the file stream when the determination indicates that the file is not malicious.

In this way, the network device determines whether an file is malicious as early as possible during streaming of the file (e.g., by processing an initial portion of the file). Additionally, in some implementations, the network device utilizes a machine learning model to determine whether the file is malicious, which provides a greater accuracy for identifying a malicious file (and a reduced false positive rate). Further, using the machine learning model reduces a need for storing and maintaining a database of malicious file fingerprints (e.g., to compare to a fingerprint of the file) and thereby reduces storage requirements for the network device. Thus, the network device conserves computing resources, networking resources, and/or the like that would otherwise have been consumed by processing the entire malicious file, generating false positive and/or negative indications of the malicious file, failing to identify the malicious file, and/or attempting to address the false positive and/or negative indications of the malicious file, among other examples. Accordingly, some implementations described herein provide an improved performance of the network device and/or a network associated with the network device (e.g., as compared to a typical network device and/or a network associated with the typical network device).

FIGS. 1A-1F are diagrams of an example 100 associated with blocking or allowing a file stream associated with a file based on an initial portion of the file. As shown in FIGS. 1A-1F, example 100 includes an endpoint device and a network device associated with a network. In some implementations, example 100 includes a server device (e.g., that communicates with the network device). Further details of the endpoint device, the network device, the server device, and the network are provided elsewhere herein.

As shown in FIG. 1A, and by reference number 105, the network device may receive a file stream associated with a file. For example, the endpoint device may send the file in a file stream to the network device to cause the network device to forward the file stream to a destination (e.g., another endpoint device). In some implementations, the file may be an executable file, such as a portable file, a common object file format file, or another file (e.g., a Windows file, a Linux file, or a similar file).

Figure 1B:
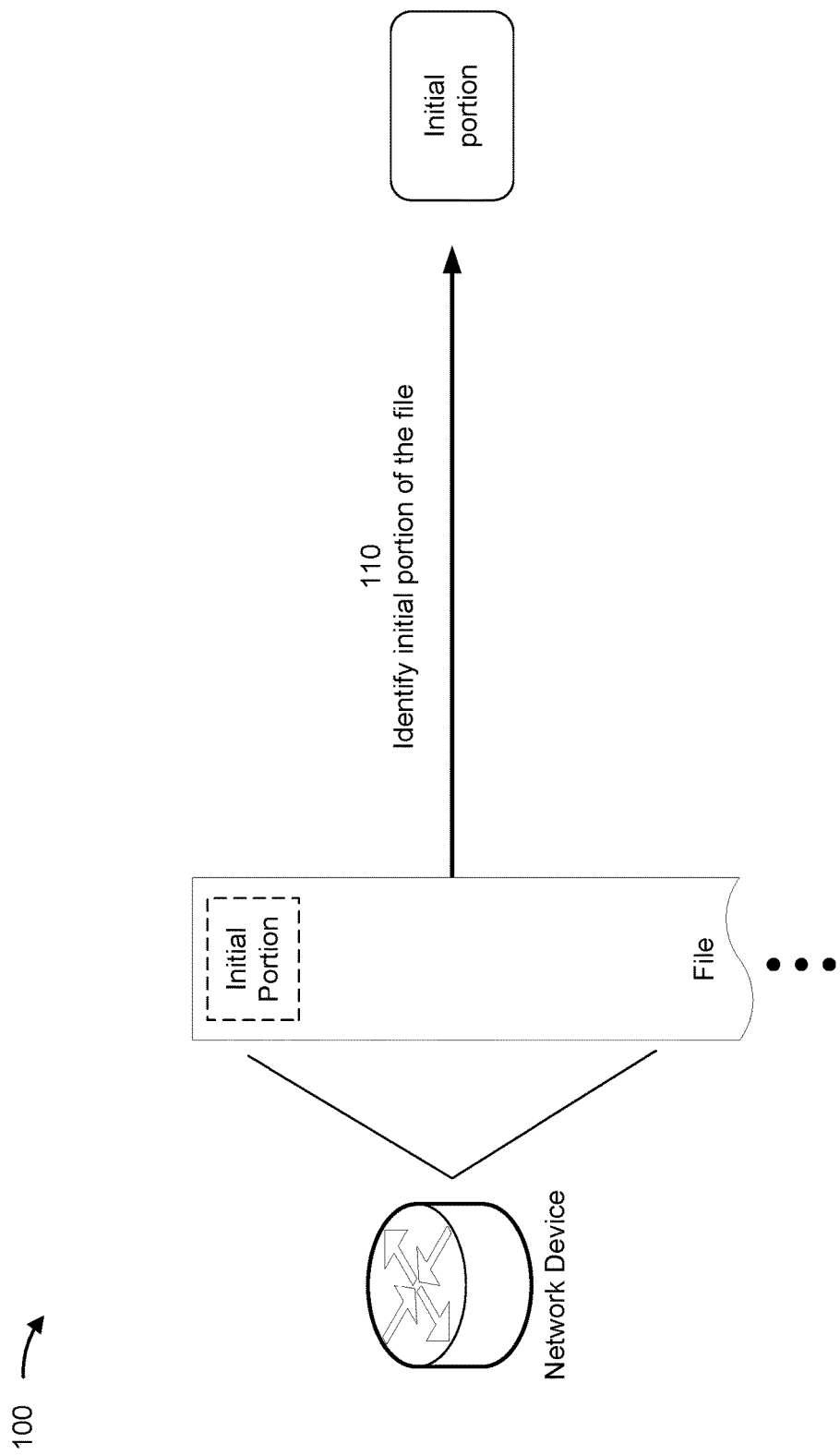

As shown in FIG. 1B, and by reference number 110, the network device may identify an initial portion of the file (e.g., while receiving the file stream or after receiving the file stream). The initial portion of the file may comprise a quantity of bytes. In some implementations, the initial portion of the file may comprise a particular quantity of bytes. For example, the particular quantity of bytes may satisfy (e.g., may be greater than or equal to) a byte quantity threshold. The byte quantity threshold may be greater than or equal to 500 bytes, 1 kilobyte, 4 kilobytes, 10 kilobytes, 1 megabyte, and/or 3 megabytes, among other examples. In some implementations, the initial portion of the file may include some or all of one or more structural elements of the file. For example, the initial portion of the file may include at least a portion of a header of the file, at least a portion of a code section of the file, and/or at least a portion of another section of the file. In some implementations, the header may include information that indicates a structure of the file.

In some implementations, the network device may determine a type of the file. For example, the network device may process the initial portion of the file to determine the type of the file. When the file is a particular type of file (e.g., the type of the file matches a file type that is indicated for further processing), such as a file, the network device may perform one or more of the processing steps described herein in relation to FIGS. 1C-1F. Alternatively, when the file is not a particular type of file (e.g., the type of the file does not match a file type that is indicated for further processing), the network device may allow the file stream (e.g., in a similar manner as that described herein in relation to FIG. 1F).

Figure 1C:
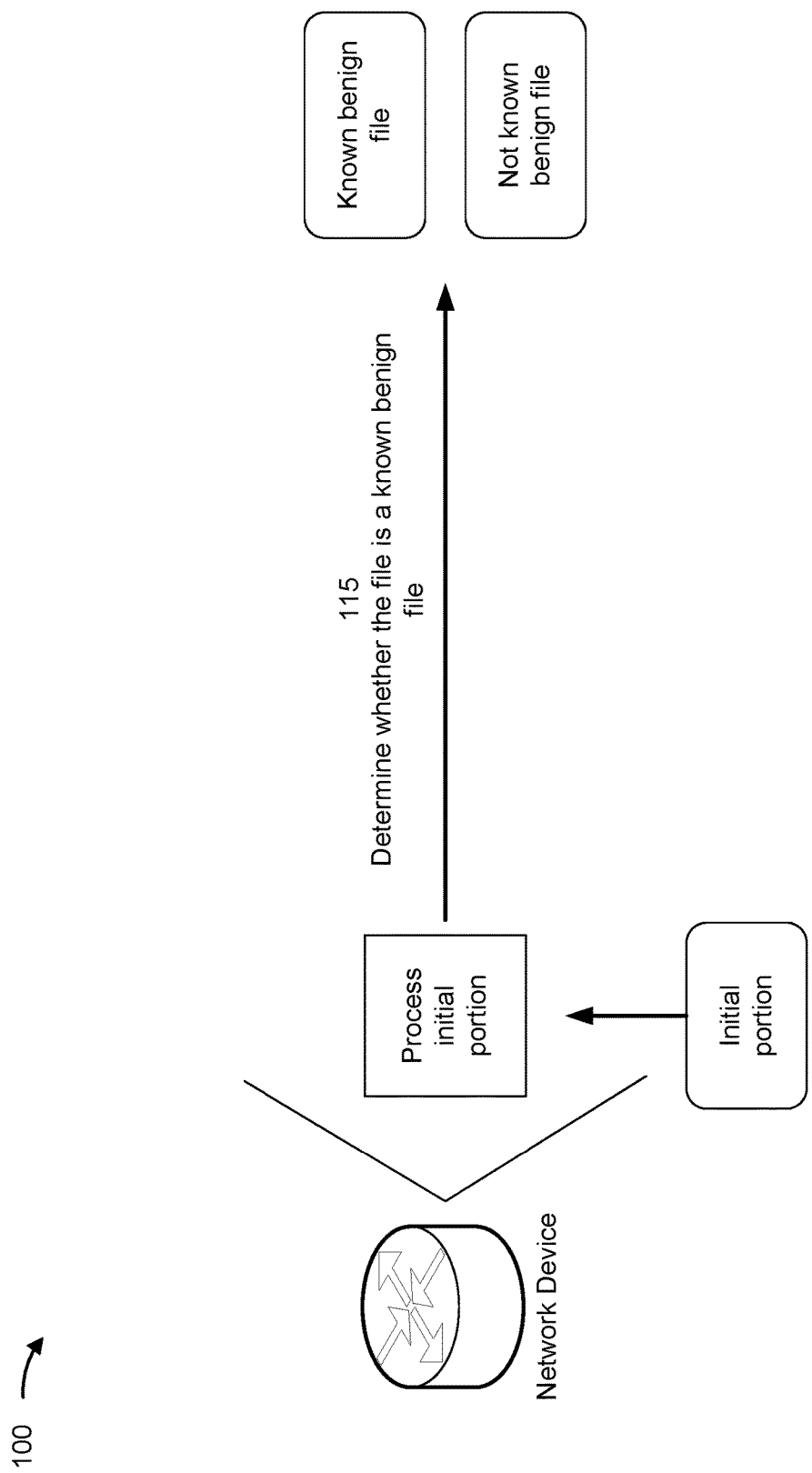

As shown in FIG. 1C, the network device may determine whether the file is a known benign file (e.g., based on the initial portion of the file). For example, the network device may process (e.g., hash) the initial portion of the file to generate a partial file signature for the file. The network device may search, based on the partial file signature, a data structure (e.g., a database, an electronic folder, and/or an electronic file) that stores partial file signatures of known benign files (e.g., partial file signatures of files that have been previously identified as, or certified as, benign by the network device or another device). The network device may determine whether the file is a known benign file based on searching the data structure. For example, when the network device identifies an entry in the data structure that is associated with the partial file signature for the file, the network device may determine that the file is a known benign file. Accordingly, the network device may allow the file stream (e.g., as further described herein in relation to FIG. 1F). As an alternative example, when the network device determines that the data structure does not include an entry that is associated with the partial file signature for the file, the network device may determine that the file is not a known benign file. Accordingly, the network device may additionally perform one or more of the processing steps described herein in relation to FIGS. 1D-1F.

Figure 1D:
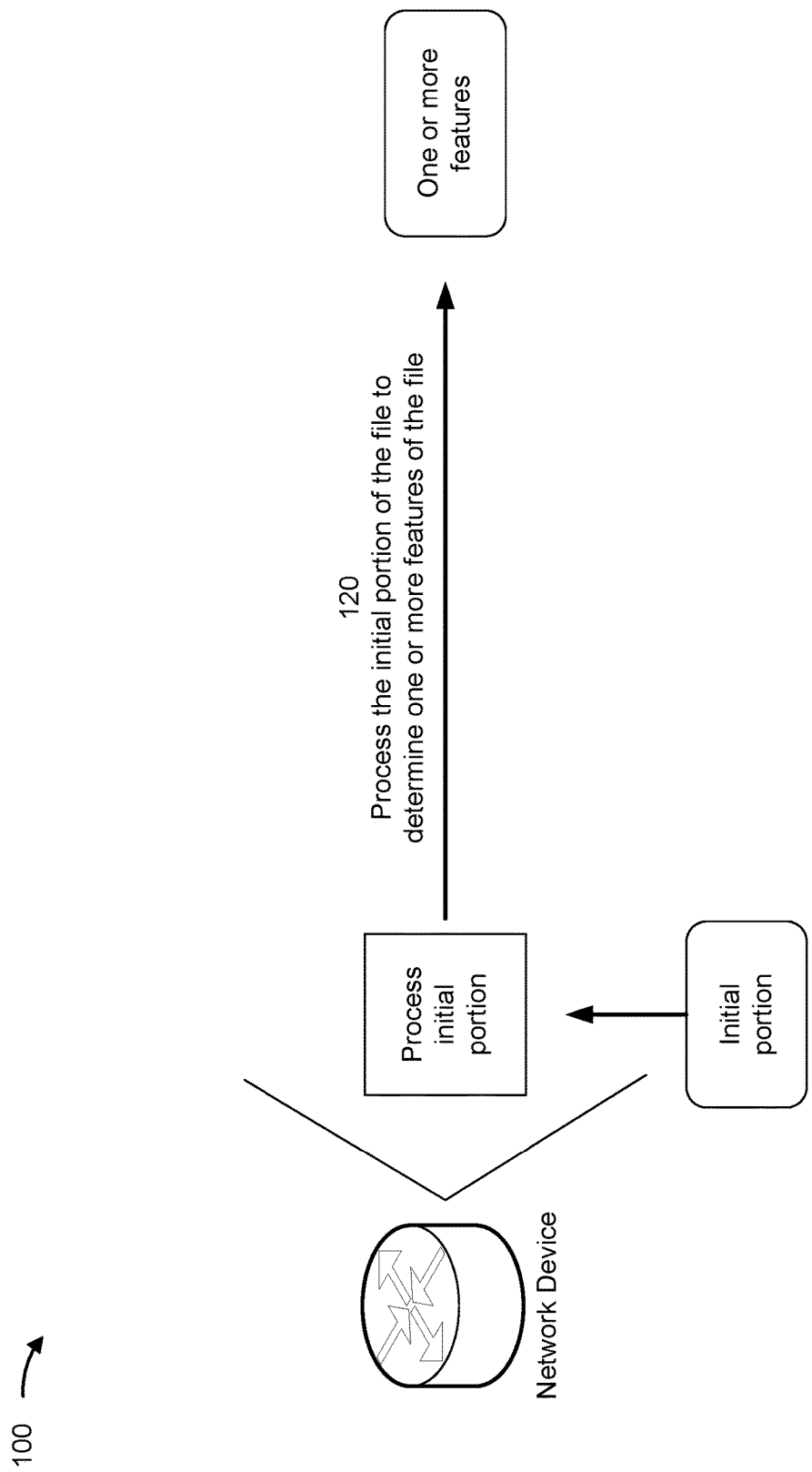

As shown in FIG. 1D, and by reference number 120, the network device may process the initial portion of the file to determine one or more features of the file. For example, the network device may parse, read, and/or analyze the header included in the initial portion of the file to determine the one or more features of the file. The one or more features of the file may include, for example, a respective size of one or more sections (e.g., the header, the code section, a security section, a resource section, and/or one or more other sections) of the file, a respective entropy of the one or more sections, a respective virtual address of the one or more sections, a respective virtual size of the one or more sections, a respective name of the one or more sections, and/or one or more other features of the file.

Figure 1E:
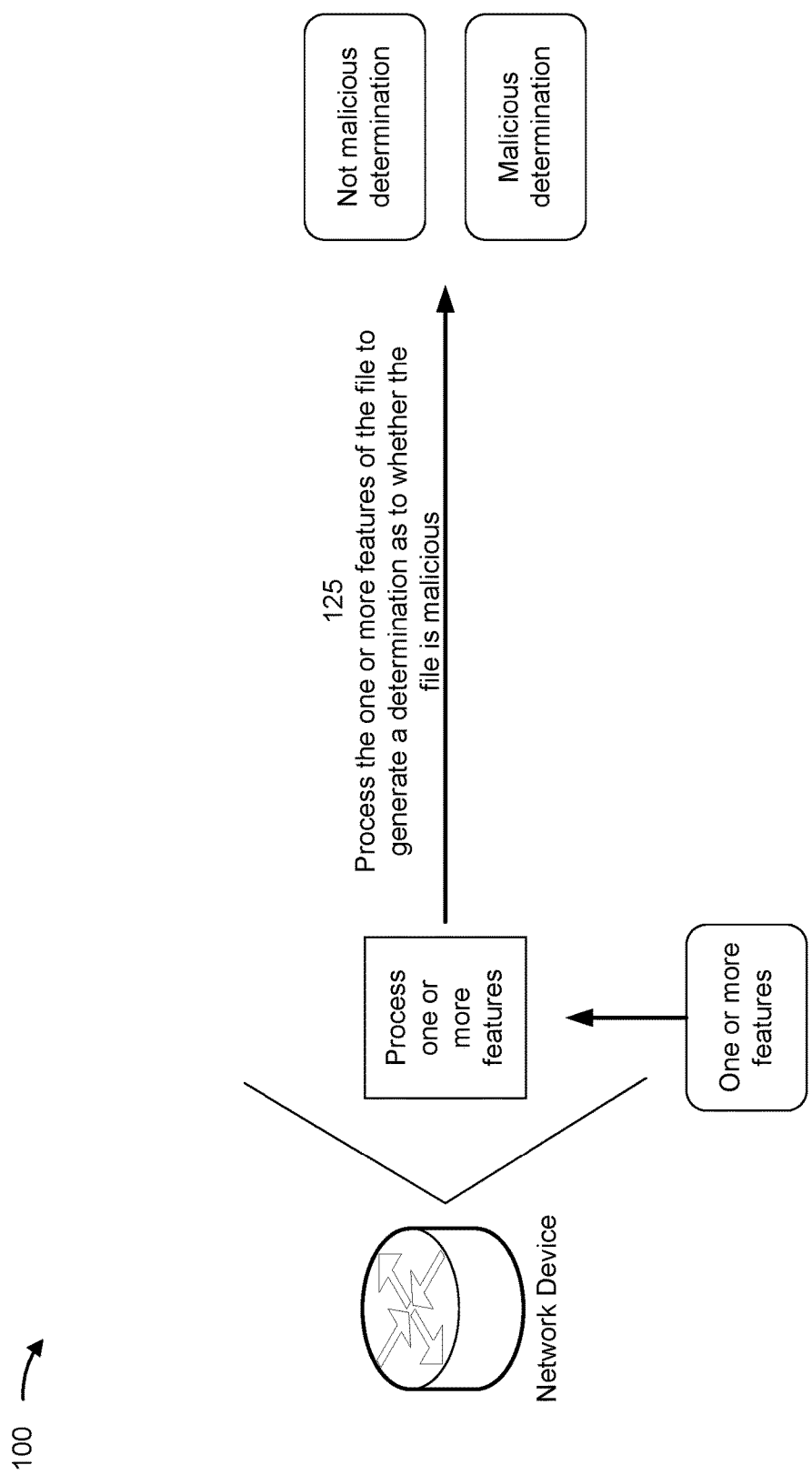

As shown in FIG. 1E, and by reference number 125, the network device may process the one or more features of the file to generate a determination as to whether the file is malicious. For example, the network device may process the one or more features of the file using a machine learning model to generate the determination. In some implementations, the network device may process at least one of the one or more features of the file to identify a structure of the file. Accordingly, the network device may select, based on the structure of the file, a machine learning model (e.g., a machine learning model that has been trained on features of files associated with the same structure) and may process, using the machine learning model, the one or more features of the file to generate the determination. The determination may indicate that the file has been determined to be either malicious or not malicious (e.g., a binary determination of maliciousness).

In some implementations, the network device may train the machine learning model based on historical information that includes sets of features of previously received files and/or additional information, such as determinations of maliciousness respectively associated with the sets of features of the previously received files. Using the historical information and/or the additional information as inputs to the machine learning model, the network device may train the machine learning model to generate a determination as to whether an file is malicious based on one or more features of the file. In some implementations, the machine learning model may be trained and/or used in a manner similar to that described below with respect to FIGS. 2-3.

Figure 1F:
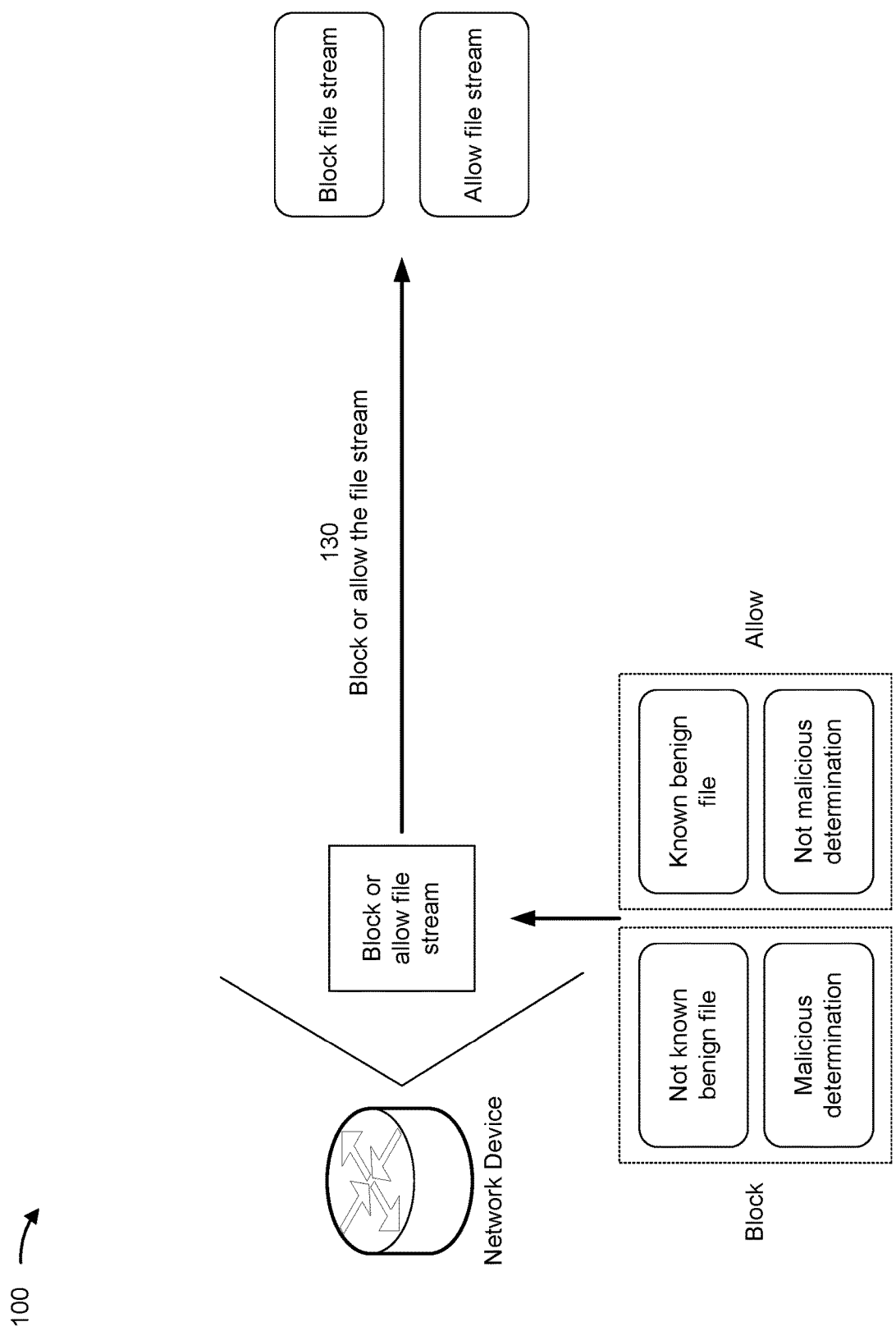

As shown in FIG. 1F, and by reference number 130, the network device may block or allow the file stream. The network device may block the file stream by dropping the file stream (e.g., dropping the file and/or one or more packets of the file as the file stream is received by the network device). The network device may allow the file stream by routing the file stream to a destination of the file stream (e.g., another endpoint device).

In some implementations, the network device may block or allow the file stream based on the network device's determination as to whether the file is a known benign file (e.g., as described herein in relation to FIG. 1C). For example, when the determination indicates that the file is a known benign file (e.g., as described herein in relation to FIG. 1C), the network device may allow the file stream (and may not perform any other processing steps described herein in relation to FIGS. 1D-1E). As another example, when the determination indicates that the file is not a known benign file (e.g., as described herein in relation to FIG. 1C), the network device may block the file stream (and may not perform any other processing steps described herein in relation to FIGS. 1D-1E).

In some implementations, the network device may block or allow the file stream based on the network device's determination as to whether the file is malicious. For example, when the determination indicates that the file is not malicious (e.g., as described herein in relation to FIG. 1E), the network device may allow the file stream. As another example, when the determination indicates that the file is malicious (e.g., as described herein in relation to FIG. 1E), the network device may block the file stream.

In some implementations, the network device may communicate with the server device (e.g., described elsewhere herein) to determine whether to block or allow the file stream. For example, the network device may send the initial portion of the file to the server device to cause the server device to perform one or more or processing steps described herein in relation to FIGS. 1C-1E. Accordingly, the server device may process the initial portion of the file (e.g., in a similar manner as described elsewhere herein) and may send a determination to the network device to cause the network device to block or allow the file stream. For example, the server device may send a determination as to whether the file is a known benign file (e.g., as described herein in relation to FIG. 1C), which may cause the network device to block the file stream when the determination indicates that the file is not a known benign file, or may cause the network device to allow the file stream when the determination indicates that the file is a known benign file. As another example, the server device may send a determination as to whether the file is malicious (e.g., as described herein in relation to FIG. 1E), which may cause the network device to block the file stream when the determination indicates that the file is malicious or may cause the network device to allow the file stream when the determination indicates that the file is not malicious.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
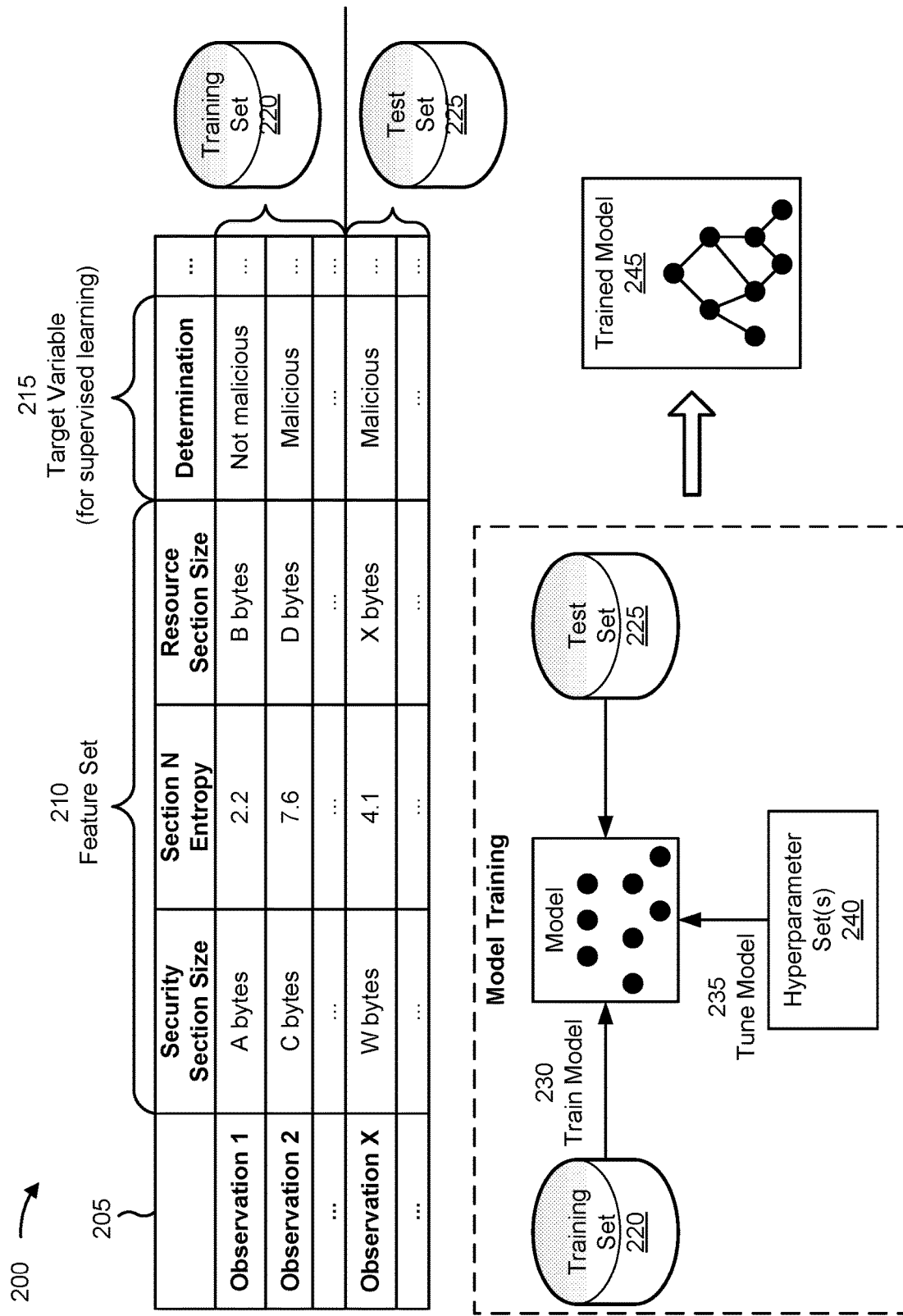
FIGS. 2-3 are diagrams illustrating examples of training and using a machine learning model in connection with generating a determination as to whether a file is malicious.

FIG. 2 is a diagram illustrating an example 200 of training a machine learning model in connection with generating a determination as to whether an file is malicious. The machine learning model training described herein may be performed using a machine learning system. The machine learning system may include or may be included in a computing device, a server, a cloud computing environment, or the like, such as the endpoint device 410, the network device 420, and/or the server device 430 described in more detail below.

As shown by reference number 205, a machine learning model may be trained using a set of observations. The set of observations may be obtained and/or input from training data (e.g., historical data), such as data gathered during one or more processes described herein. For example, the set of observations may include data gathered from the endpoint device 410, the network device 420, and/or the server device 430, as described elsewhere herein. In some implementations, the machine learning system may receive the set of observations (e.g., as input) from the endpoint device 410, the network device 420, the server device 430, and/or another device.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the endpoint device 410, the network device 420, and/or the server device 430. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of security section size (e.g., of an file), a second feature of section N size (e.g., a size of a section N of the file), a third feature of resource section size (e.g., a size of a resource section of the file), and so on. As shown, for a first observation, the first feature may have a value of A bytes (where A is a numerical value), the second feature may have a value of 2.2 (e.g., within a file entropy scale of 0.0 to 8.0), the third feature may have a value of B bytes (where B is a numerical value), and so on. These features and feature values are provided as examples, and may differ in other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No, Malicious or Not malicious), among other examples. A target variable may be associated with a target variable value, and a target variable value may be specific to an observation. In some cases, different observations may be associated with different target variable values. In example 200, the target variable is a determination (e.g., a determination of maliciousness of a file), which has a value of not malicious for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k-1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
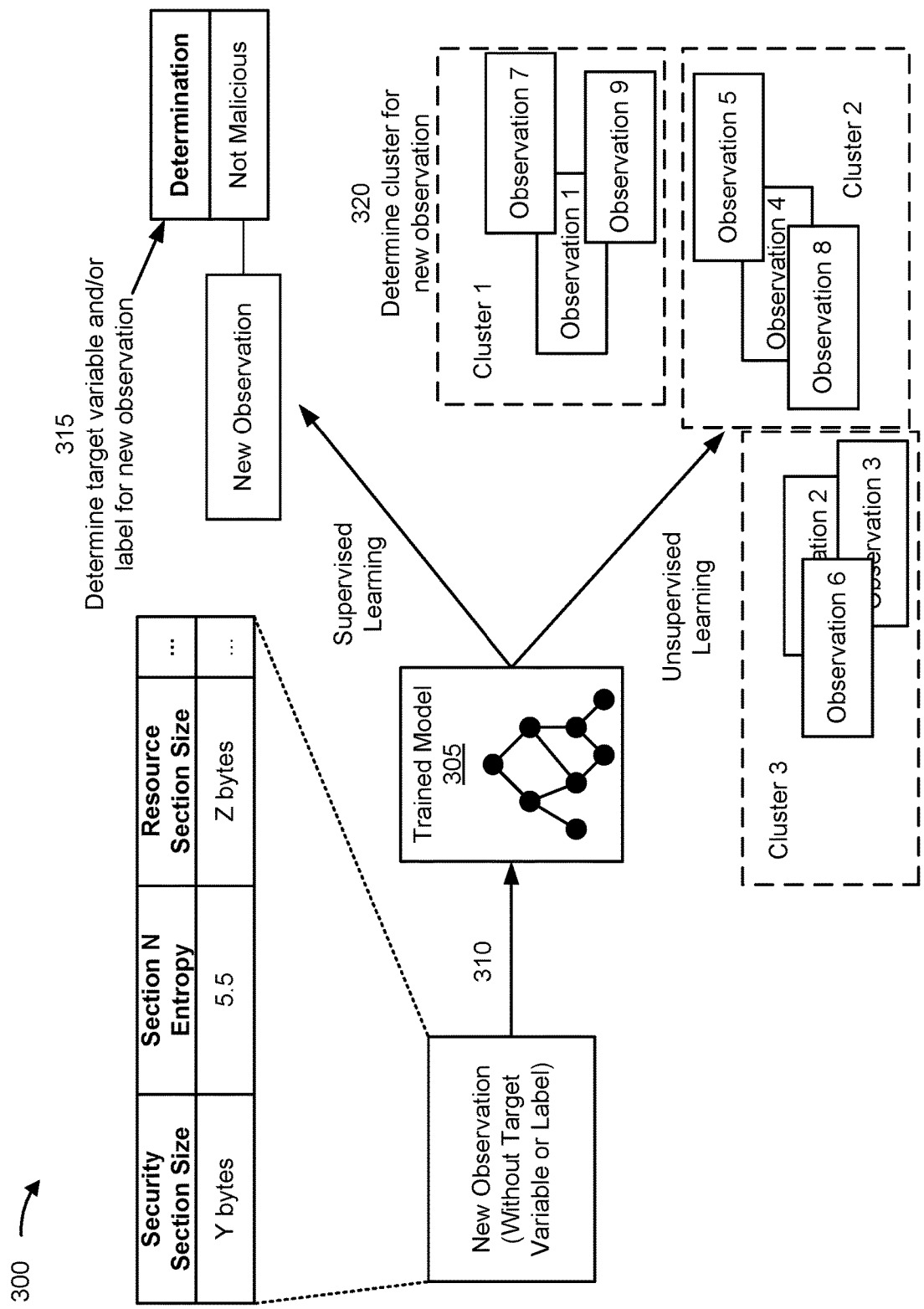

FIG. 3 is a diagram illustrating an example 300 of applying a trained machine learning model to a new observation associated with generating a determination as to whether a file is malicious. The new observation may be input to a machine learning system that stores a trained machine learning model 305. In some implementations, the trained machine learning model 305 may be the trained machine learning model 245 described above in connection with FIG. 2. The machine learning system may include or may be included in a computing device, a server, or a cloud computing environment, such as the endpoint device 410, the network device 420, and/or the server device 430.

As shown by reference number 310, the machine learning system may receive a new observation (or a set of new observations), and may input the new observation to the machine learning model 305. As shown, the new observation may include a first feature of Y bytes (where Y is a numerical value), a second feature of 5.5, a third feature of Z bytes (where Z is a numerical value), and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 305 may predict a value of not malicious for the target variable of determination (e.g., of maliciousness) for the new observation, as shown by reference number 315. Based on this prediction (e.g., based on the value having a particular label or classification or based on the value satisfying or failing to satisfy a threshold), the machine learning system may provide a recommendation and/or output for determination of a recommendation, such as allow a file stream associated with a file that is associated with the new observation. Additionally, or alternatively, the machine learning system may perform an automated action and/or may cause an automated action to be performed (e.g., by instructing another device to perform the automated action), such as automatically allowing or allowing the file stream. As another example, if the machine learning system were to predict a value of malicious for the target variable of determination, then the machine learning system may provide a different recommendation (e.g., drop the file stream) and/or may perform or cause performance of a different automated action (e.g., automatically drop the file stream). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 305 may classify (e.g., cluster) the new observation in a cluster, as shown by reference number 320. The observations within a cluster may have a threshold degree of similarity. As an example, if the machine learning system classifies the new observation in a first cluster (e.g., not malicious), then the machine learning system may provide a first recommendation, such as allow the file stream. Additionally, or alternatively, the machine learning system may perform a first automated action and/or may cause a first automated action to be performed (e.g., by instructing another device to perform the automated action) based on classifying the new observation in the first cluster, such as automatically allow the file stream.

In this way, the machine learning system may apply a rigorous and automated process to generating a determination as to whether a file is malicious. The machine learning system enables recognition and/or identification of tens, hundreds, thousands, or millions of features and/or feature values for tens, hundreds, thousands, or millions of observations, thereby increasing accuracy and consistency and reducing delay associated with generating a determination as to whether a file is malicious relative to requiring computing resources to be allocated for tens, hundreds, or thousands of operators to manually generat a determination as to whether a file is malicious using the features or feature values.

As indicated above, FIG. 3 is provided as an example. Other examples may differ from what is described in connection with FIG. 3.

Figure 4:
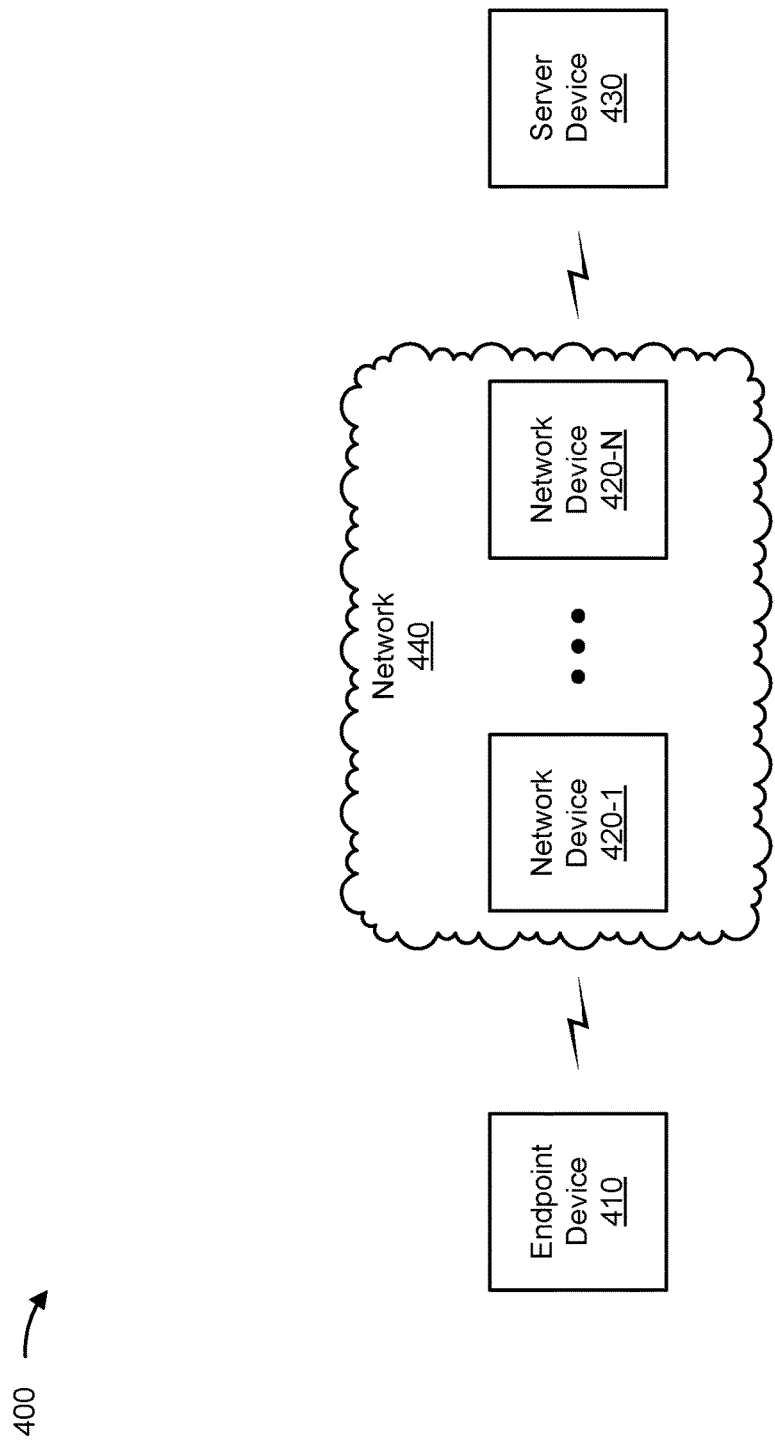
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include an endpoint device 410, a group of network devices 420 (shown as network device 420-1 through network device 420-N), a server device 430, and a network 440. Devices of environment 400 may interconnect via wired connections, wireless connections, or a combination of wired and wireless connections.

Endpoint device 410 includes one or more devices capable of receiving, generating, storing, processing, and/or providing information, such as information described herein. For example, endpoint device 410 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 410 may receive network traffic from and/or may provide network traffic to other endpoint devices 410 and/or server device 430, via network 440 (e.g., by routing packets using network devices 420 as intermediaries). In some implementations, endpoint device 410 may send a file stream that includes a file to network device 420.

Network device 420 includes one or more devices capable of receiving, processing, storing, routing, and/or providing information, such as information described herein. For example, network device 420 may include a router, such as a label switching router (LSR), a label edge router (LER), an ingress router, an egress router, a provider router (e.g., a provider edge router or a provider core router), a virtual router, or another type of router. Additionally, or alternatively, network device 420 may include a gateway, a switch, a firewall, a hub, a bridge, a reverse proxy, a server (e.g., a proxy server, a cloud server, or a data center server), a load balancer, and/or a similar device. In some implementations, network device 420 may be a physical device implemented within a housing, such as a chassis. In some implementations, network device 420 may be a virtual device implemented by one or more computer devices of a cloud computing environment or a data center. In some implementations, a group of network devices 420 may be a group of data center nodes that are used to route traffic flow through network 440. In some implementations, network device 420 may receive a file stream associated with a file from endpoint device 410, may process an initial portion of the file to generate a determination as to whether the file is malicious, and may block or allow the file stream based on the determination.

Server device 430 includes one or more devices capable of receiving, generating, storing, processing, and/or providing information, such as information described herein. Server device 430 may include a communication device and/or a computing device. For example, server device 430 may include a server, such as an application server, a client server, a web server, a database server, a host server, a proxy server, a virtual server (e.g., executing on computing hardware), or a server in a cloud computing system. In some implementations, server device 430 includes computing hardware used in a cloud computing environment. In some implementations, server device 430 may receive an initial portion of a file associated with a file stream from network device 420, may process the initial portion to generate a determination as to whether the file is malicious, and may cause the file stream to be blocked or allowed (e.g., by communicating with network device 420) based on the determination.

Network 440 includes one or more wired and/or wireless networks. For example, network 440 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
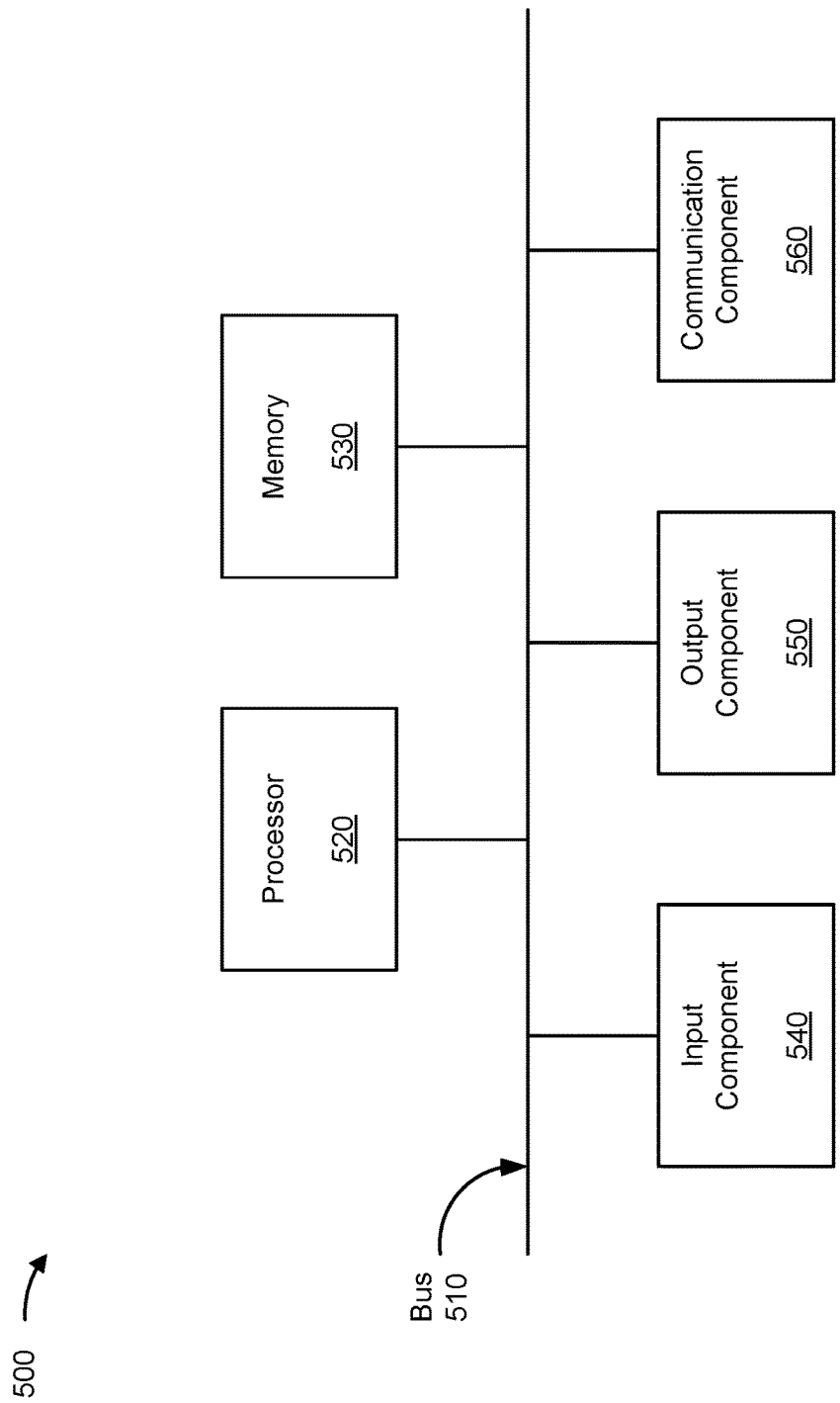
FIGS. 5 and 6 are diagrams of example components of one or more devices of FIG. 2.

FIG. 5 is a diagram of example components of a device 500, which may correspond to the endpoint device 410, the network device 420, and/or the server device 430. In some implementations, the endpoint device 410, the network device 420, and/or the server device 430 include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
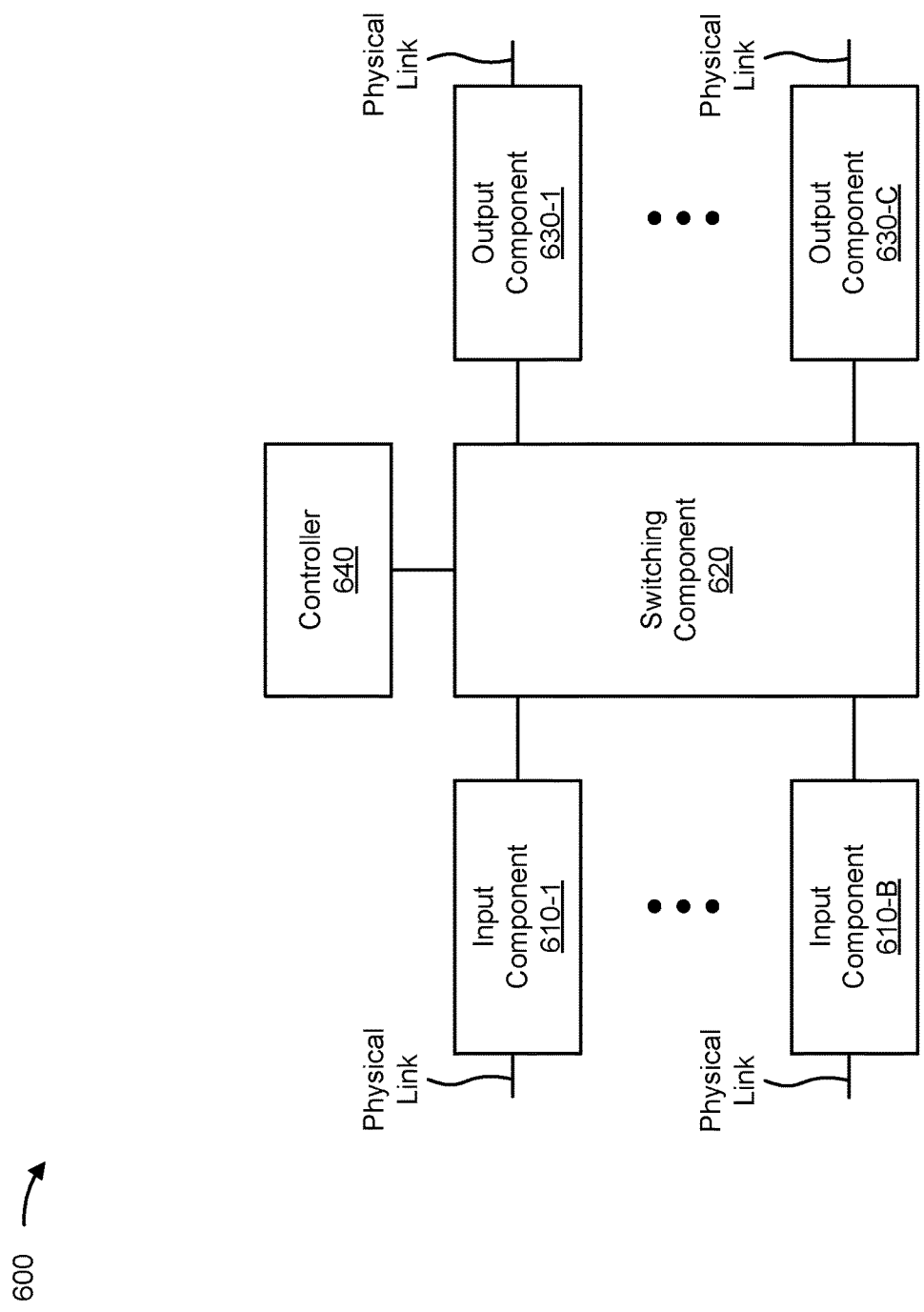

FIG. 6 is a diagram of example components of a device 600. Device 600 may correspond to the endpoint device 410, the network device 420, and/or the server device 430. In some implementations, the endpoint device 410, the network device 420, and/or the server device 430 may include one or more devices 600 and/or one or more components of device 600. As shown in FIG. 6, device 600 may include one or more input components 610-1 through 610-B (B≥1) (hereinafter referred to collectively as input components 610, and individually as input component 610), a switching component 620, one or more output components 630-1 through 630-C (C≥1) (hereinafter referred to collectively as output components 630, and individually as output component 630), and a controller 640.

Input component 610 may be one or more points of attachment for physical links and may be one or more points of entry for incoming traffic, such as packets. Input component 610 may process incoming traffic, such as by performing data link layer encapsulation or decapsulation. In some implementations, input component 610 may transmit and/or receive packets. In some implementations, input component 610 may include an input line card that includes one or more packet processing components (e.g., in the form of integrated circuits), such as one or more interface cards (IFCs), packet forwarding components, line card controller components, input ports, processors, memories, and/or input queues. In some implementations, device 600 may include one or more input components 610.

Switching component 620 may interconnect input components 610 with output components 630. In some implementations, switching component 620 may be implemented via one or more crossbars, via busses, and/or with shared memories. The shared memories may act as temporary buffers to store packets from input components 610 before the packets are eventually scheduled for delivery to output components 630. In some implementations, switching component 620 may enable input components 610, output components 630, and/or controller 640 to communicate with one another.

Output component 630 may store packets and may schedule packets for transmission on output physical links. Output component 630 may support data link layer encapsulation or decapsulation, and/or a variety of higher-level protocols. In some implementations, output component 630 may transmit packets and/or receive packets. In some implementations, output component 630 may include an output line card that includes one or more packet processing components (e.g., in the form of integrated circuits), such as one or more IFCs, packet forwarding components, line card controller components, output ports, processors, memories, and/or output queues. In some implementations, device 600 may include one or more output components 630. In some implementations, input component 610 and output component 630 may be implemented by the same set of components (e.g., and input/output component may be a combination of input component 610 and output component 630).

Controller 640 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 640 may include one or more processors that can be programmed to perform a function.

In some implementations, controller 640 may include a RAM, a ROM, and/or another type of dynamic or static storage device (e.g., a flash memory, a magnetic memory, an optical memory, etc.) that stores information and/or instructions for use by controller 640.

In some implementations, controller 640 may communicate with other devices, networks, and/or systems connected to device 600 to exchange information regarding network topology. Controller 640 may create routing tables based on the network topology information, may create forwarding tables based on the routing tables, and may forward the forwarding tables to input components 610 and/or output components 630. Input components 610 and/or output components 630 may use the forwarding tables to perform route lookups for incoming and/or outgoing packets.

Controller 640 may perform one or more processes described herein. Controller 640 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 640 from another computer-readable medium or from another device via a communication interface. When executed, software instructions stored in a memory and/or storage component associated with controller 640 may cause controller 640 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
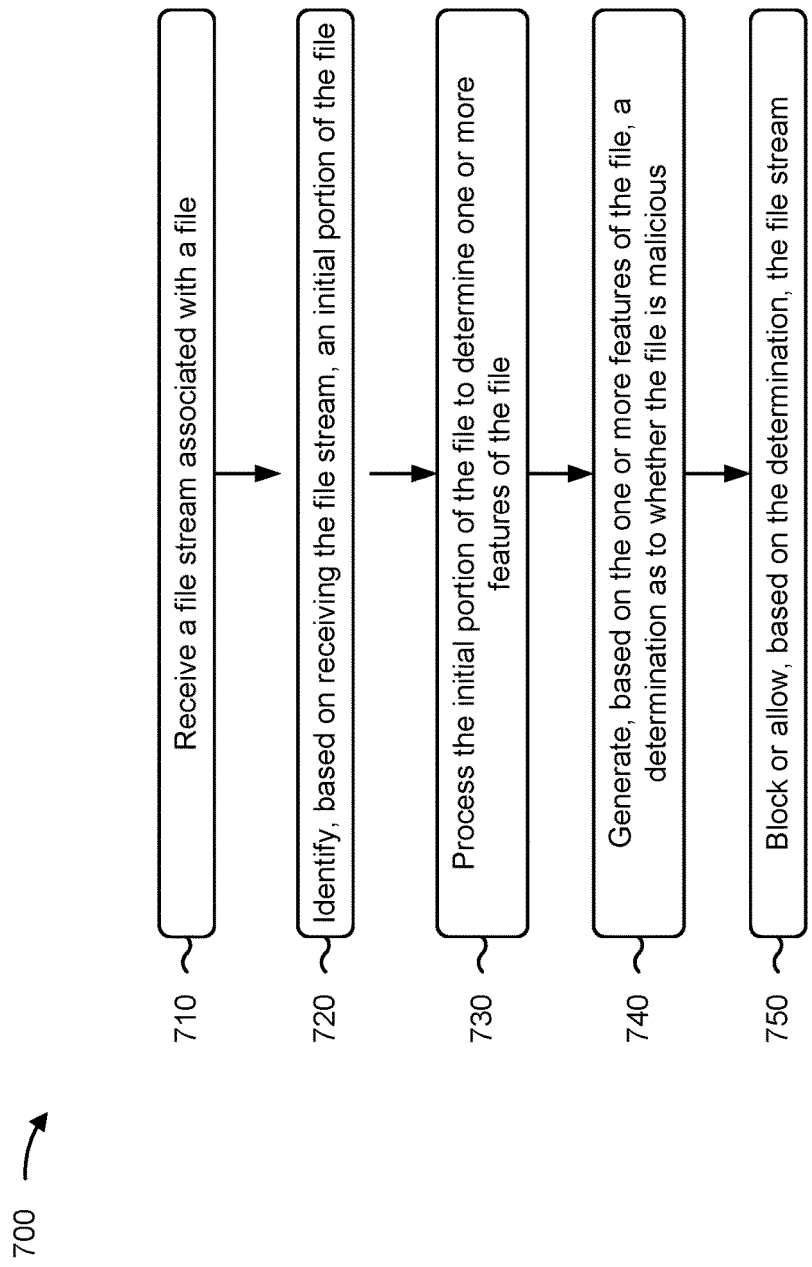
FIGS. 7-8 are flowcharts of example processes relating to blocking or allowing a file stream associated with a file based on an initial portion of the file.

FIG. 7 is a flowchart of an example process 700 associated with blocking or allowing a file stream associated with a file based on an initial portion of the file. In some implementations, one or more process blocks of FIG. 7 are performed by a network device (e.g., network device 420). In some implementations, one or more process blocks of FIG. 7 are performed by another device or a group of devices separate from or including the network device, such as an endpoint device (e.g., endpoint device 410) and/or a server device (e.g., server device 430). Additionally, or alternatively, one or more process blocks of FIG. 7 may be performed by one or more components of device 500, such as processor 520, memory 530, input component 540, output component 550, and/or communication component 560; one or more components of device 600, such as input component 610, switching component 620, output component 630, and/or control 640; and/or one or more components of another device.

As shown in FIG. 7, process 700 may include receiving a file stream associated with an file (block 710). For example, the network device may receive a file stream associated with an file, as described above.

As further shown in FIG. 7, process 700 may include identifying, based on receiving the file stream, an initial portion of the file (block 720). For example, the network device may identify, based on receiving the file stream, an initial portion of the file, as described above.

As further shown in FIG. 7, process 700 may include processing the initial portion of the file to determine one or more features of the file (block 730). For example, the network device may process the initial portion of the file to determine one or more features of the file, as described above.

As further shown in FIG. 7, process 700 may include generating, based on the one or more features of the file, a determination as to whether the file is malicious (block 740). For example, the network device may generate, based on the one or more features of the file, a determination as to whether the file is malicious, as described above.

As further shown in FIG. 7, process 700 may include blocking or allowing, based on the determination, the file stream (block 750). For example, the network device may block or allow, based on the determination, the file stream, as described above.

Process 700 may include additional implementations, such as any single implementation or any combination of implementations described below and/or in connection with one or more other processes described elsewhere herein.

In a first implementation, the file is a portable file, or a common object file format file.

In a second implementation, alone or in combination with the first implementation, the initial portion of the file comprises a quantity of bytes, and wherein the quantity of bytes satisfies a byte quantity threshold. The byte quantity threshold may be greater than or equal to four kilobytes.

In a third implementation, alone or in combination with one or more of the first and second implementations, the initial portion of the file includes at least a portion of a header of the file or at least a portion of a code section of the file.

In a fourth implementation, alone or in combination with one or more of the first through third implementations, generating the determination as to whether the file is malicious includes identifying, based on at least one of the one or more features of the file, a structure of the file, selecting, based on the structure of the file, a machine learning model, and processing, using the machine learning model, the one or more features of the file to generate the determination as to whether the file is malicious.

In a fifth implementation, alone or in combination with one or more of the first through fourth implementations, the determination indicates that the file is malicious and the network device blocks the file stream.

In a sixth implementation, alone or in combination with one or more of the first through fifth implementations, the determination indicates that the file is not malicious and the network device allows the file stream.

In a seventh implementation, alone or in combination with one or more of the first through sixth implementations, prior to processing the initial portion of the file to determine the one or more features of the file, process 700 includes processing the initial portion of the file to generate a partial file signature for the file, searching, based on the partial file signature, a data structure that stores partial file signatures of known benign files, and determining, based on searching the data structure, that the file is not a known benign file.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

Figure 8:
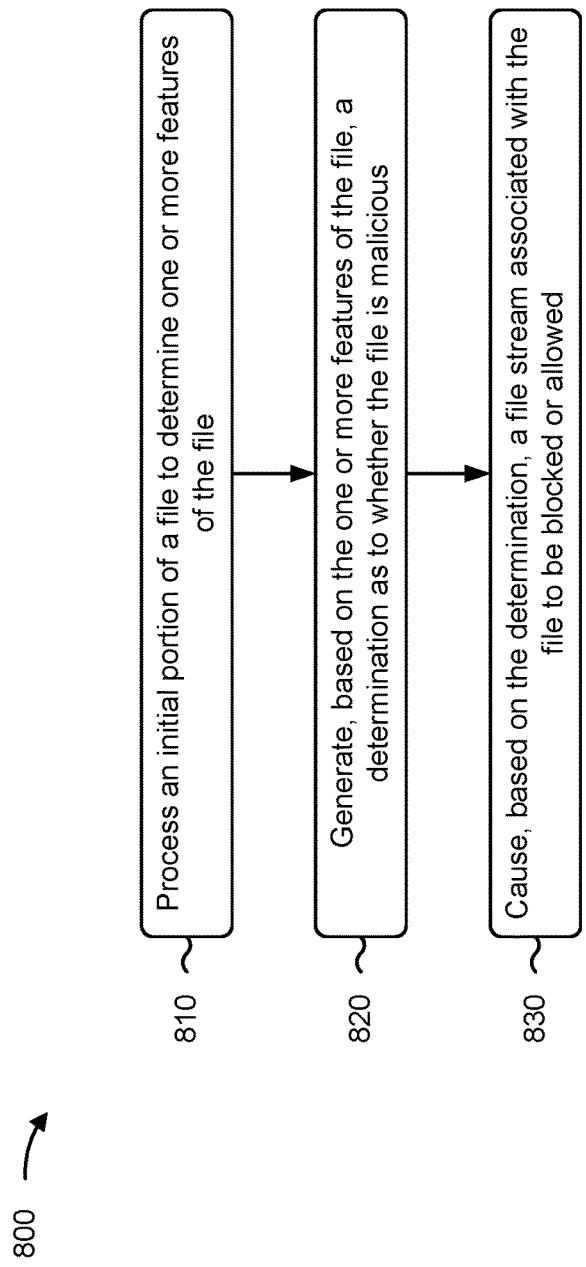

FIG. 8 is a flowchart of an example process 800 associated with blocking or allowing a file stream associated with a file based on an initial portion of the file. In some implementations, one or more process blocks of FIG. 8 are performed by a device (e.g., network device 420 or server device 430). In some implementations, one or more process blocks of FIG. 8 are performed by another device or a group of devices separate from or including the device, such as an endpoint device (e.g., endpoint device 410). Additionally, or alternatively, one or more process blocks of FIG. 8 may be performed by one or more components of device 500, such as processor 520, memory 530, input component 540, output component 550, and/or communication component 560; one or more components of device 600, such as input component 610, switching component 620, output component 630, and/or control 640; and/or one or more components of another device.

As shown in FIG. 8, process 800 may include processing an initial portion of an file to determine one or more features of the file (block 810). For example, the device may process an initial portion of an file to determine one or more features of the file, as described above.

As further shown in FIG. 8, process 800 may include generating, based on the one or more features of the file, a determination as to whether the file is malicious (block 820). For example, the device may generate, based on the one or more features of the file, a determination as to whether the file is malicious, as described above.

As further shown in FIG. 8, process 800 may include causing, based on the determination, a file stream associated with the file to be blocked or allowed (block 830). For example, the device may cause, based on the determination, a file stream associated with the file to be blocked or allowed, as described above.

Process 800 may include additional implementations, such as any single implementation or any combination of implementations described below and/or in connection with one or more other processes described elsewhere herein.

In a first implementation, the initial portion of the file comprises a specific quantity of bytes.

In a second implementation, alone or in combination with the first implementation, generating the determination as to whether the file is malicious comprises processing, using a machine learning model, the one or more features of the file to generate the determination as to whether the file is malicious.

In a third implementation, alone or in combination with one or more of the first and second implementations, causing the file stream associated with the file to be blocked or allowed comprises sending the determination to a network device associated with the network device, wherein the network device is to block the file stream when the determination indicates that the file is malicious, or wherein the network device is to allow the file stream when the determination indicates that the file is not malicious.

In a fourth implementation, alone or in combination with one or more of the first through third implementations, process 800 includes processing the initial portion of the file to generate a partial file signature for the file, and determining, based on the partial file signature for the file, that the initial portion is not a known benign file.

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network device, comprising:
one or more memories; and
one or more processors to:
receive a file stream associated with a file;
identify, based on receiving the file stream, an initial portion of the file;
process the initial portion of the file to determine a file type of the file and one or more features of the file, wherein the one or more features include a respective entropy of one or more sections of the file;
determine that the file is a type of file associated with further processing based on the file type;
generate, based on the file being the type of file associated with the further processing and based on the one or more features of the file, a determination as to whether the file is malicious,
wherein the file stream is forwarded towards a destination device without generating the determination when the file is not the type of file associated with the further processing; and
block or allow, based on the determination, the file stream.

2. The network device of claim 1, wherein the file is:
a portable file; or
a common object file format file.

3. The network device of claim 1, wherein the initial portion of the file includes a header of the file.

4. The network device of claim 1, wherein the one or more processors, to generate the determination as to whether the file is malicious, are to:
identify, based on at least one of the one or more features of the file, a structure of the file;
select, based on the structure of the file, a machine learning model; and
process, using the machine learning model, the one or more features of the file to generate the determination as to whether the file is malicious.

5. The network device of claim 1, wherein the determination indicates that the file is malicious, and
wherein the one or more processors, to block or allow the file stream, are to:
block the file stream.

6. The network device of claim 1, wherein the determination indicates that the file is not malicious,
wherein the one or more processors, to block or allow the file stream, are to:
allow the file stream.

7. The network device of claim 1, wherein the one or more processors, prior to determining that the file is the type of file associated with further processing, are further to:
process the initial portion of the file to generate a partial file signature for the file;
search, based on the partial file signature, a data structure that stores partial file signatures of known benign files; and
determine, based on searching the data structure, that the file is not a known benign file.

8. The network device of claim 1, wherein the file stream is blocked when the file is not a known benign file.

9. A non-transitory computer-readable medium storing a set of instructions, the set of instructions comprising:
one or more instructions that, when executed by one or more processors of a network device, cause the network device to:
receive a file stream associated with a file;
identify, based on receiving the file stream, an initial portion of the file;
determine, based on the initial portion of the file, a file type of the file;
determine that the file is not a known benign file based on the file type of the file;
process, after determining that the file is not a known benign file, the initial portion of the file to determine one or more features of the file,
wherein the one or more features include
a respective entropy of one or more sections of the file; and
wherein the file stream is forwarded towards a destination device without processing the initial portion of the file to determine the one or more features of the file when the file is the known benign file;
generate, based on the one or more features of the file, a determination as to whether the file is malicious; and
block or allow, based on the determination, the file stream.

10. The non-transitory computer-readable medium of claim 9, wherein the initial portion of the file comprises a quantity of bytes that satisfies a byte quantity threshold,
wherein the byte quantity threshold is greater than or equal to four kilobytes.

11. The non-transitory computer-readable medium of claim 9, wherein the initial portion of the file includes at least one of:
at least a portion of a header of the file; or
at least a portion of a code section of the file.

12. The non-transitory computer-readable medium of claim 9, wherein the one or more instructions, that cause the network device to determine that the file is not a known benign file, cause the network device to:
process the initial portion of the file to generate a partial file signature for the file;
search, based on the partial file signature, a data structure that stores partial file signatures of known benign files; and
determine, based on searching the data structure, that the file is not a known benign file.

13. The non-transitory computer-readable medium of claim 9, wherein the one or more instructions, that cause the network device to generate the determination as to whether the file is malicious, cause the network device to:
select, based on a structure of the file, a machine learning model; and
process, using the machine learning model, the one or more features of the file to generate the determination as to whether the file is malicious.

14. The non-transitory computer-readable medium of claim 9, wherein the network device blocks the file stream when the determination indicates that the file is malicious.

15. The non-transitory computer-readable medium of claim 9, wherein the network device allows the file stream when the determination indicates that the file is not malicious.

16. A method, comprising:
processing, by a device, an initial portion of a file to determine a file type of the file and one or more features of the file,
wherein the one or more features include a respective entropy of one or more sections of the file;
determining, by the device, that the file is a type of file associated with further processing based on the file type;
generating, by the device and based on the file being the type of file associated with the further processing and the one or more features of the file, a determination as to whether the file is malicious,
wherein a file stream associated with the file is forwarded towards a destination device without generating the determination when the file is not the type of file associated with the further processing; and
causing, by the device and based on the determination, the file stream associated with the file to be blocked or allowed.

17. The method of claim 16, wherein the initial portion of the file comprises a specific quantity of bytes.

18. The method of claim 16, wherein generating the determination as to whether the file is malicious comprises:
processing, using a machine learning model, the one or more features of the file to generate the determination as to whether the file is malicious.

19. The method of claim 16, wherein causing the file stream associated with the file to be blocked or allowed comprises:
sending the determination to a network device associated with the device,
wherein the network device is to block the file stream when the determination indicates that the file is malicious, or
wherein the network device is to allow the file stream when the determination indicates that the file is not malicious.

20. The method of claim 16, further comprising, prior to processing the initial portion of the file to determine the one or more features of the file:
processing the initial portion of the file to generate a partial file signature for the file; and
determining, based on the partial file signature for the file, that the initial portion is not a known benign file.

* * * * *